US012666291B2

(12) United States Patent
Yang et al.

(10) Patent No.: US 12,666,291 B2
(45) Date of Patent: Jun. 23, 2026

(54) RS MEASUREMENT METHOD AND APPARATUS, AND COMMUNICATIONS DEVICE

(71) Applicant: VIVO MOBILE COMMUNICATION CO., LTD., Dongguan (CN)

(72) Inventors: Ang Yang, Dongguan (CN); Peng Sun, Dongguan (CN); Yu Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 524 days.

(21) Appl. No.: 18/106,447

(22) Filed: Feb. 6, 2023

(65) Prior Publication Data

US 2023/0189042 A1 Jun. 15, 2023

Related U.S. Application Data

(63) Continuation of application No. PCT/CN2021/111297, filed on Aug. 6, 2021.

(30) Foreign Application Priority Data

Aug. 6, 2020 (CN) .......................... 202010785219.2

(51) Int. Cl.
  *H04W 24/10* (2009.01)
  *H04L 1/00* (2006.01)
  *H04L 5/00* (2006.01)
(52) U.S. Cl.
  CPC ........... *H04W 24/10* (2013.01); *H04L 1/0067* (2013.01); *H04L 5/0051* (2013.01)
(58) Field of Classification Search
  CPC .... H04W 24/10; H04L 1/0067; H04L 5/0051; H04L 5/0057; H04L 1/0013; H04L 5/0048; H04L 1/0002
  See application file for complete search history.

(56) References Cited

U.S. PATENT DOCUMENTS

2012/0113843 A1* 5/2012 Watfa .................... H04W 72/23
                                                370/252
2019/0289513 A1 9/2019 Jeon et al.
         (Continued)

FOREIGN PATENT DOCUMENTS

CA      3099848 A1   11/2019
CN     107820717 A    3/2018
         (Continued)

OTHER PUBLICATIONS

Extended European Search Report issued in related European Application No. 21854134.0, mailed Dec. 1, 2023, 9 pages.
         (Continued)

*Primary Examiner* — Chuong A Ngo
(74) *Attorney, Agent, or Firm* — IPX PLLC

(57) ABSTRACT

A Reference Signal (RS) measurement method and apparatus, and a communications device are provided. When being performed by a terminal, the RS measurement method includes: receiving RS measurement indication information sent by a network-side device. The RS measurement indication information is used to indicate that the terminal performs layer 1 beam measurement for an RS of a first cell. The RS measurement method further includes performing the layer 1 beam measurement for the RS of the first cell based on the RS measurement indication information. The terminal performs scheduling restriction or rate matching on a second cell when performing the layer 1 beam measurement for the RS of the first cell.

20 Claims, 4 Drawing Sheets

(56)                    References Cited

U.S. PATENT DOCUMENTS

| | | | |
|---|---|---|---|
| 2020/0107337 A1* | 4/2020 | Lin | ....................... H04L 1/0026 |
| 2021/0360460 A1* | 11/2021 | Taherzadeh Boroujeni | ................ |
| | | | H04B 7/0632 |
| 2022/0232549 A1* | 7/2022 | Yeo | ....................... H04L 5/0057 |

FOREIGN PATENT DOCUMENTS

| | | | |
|---|---|---|---|
| CN | 110574331 A | 12/2019 | |
| CN | 110622583 A | 12/2019 | |
| CN | 110959268 A | 4/2020 | |
| CN | 111247752 A | 6/2020 | |
| WO | 2019215899 A1 | 11/2019 | |

OTHER PUBLICATIONS

International Search Report issued in corresponding International Application No. PCT/CN2021/111297, mailed Nov. 4, 2021, 4 pages.
VIVO, Discussion on multi-beam enhancement, 3GPP TSG RAN WG1 #102-e, R1-2005363, Aug. 2020, 21 pages.
First Office Action issued in related Chinese Application No. 202010785219.2, mailed Aug. 3, 2022, 8 pages.

* cited by examiner

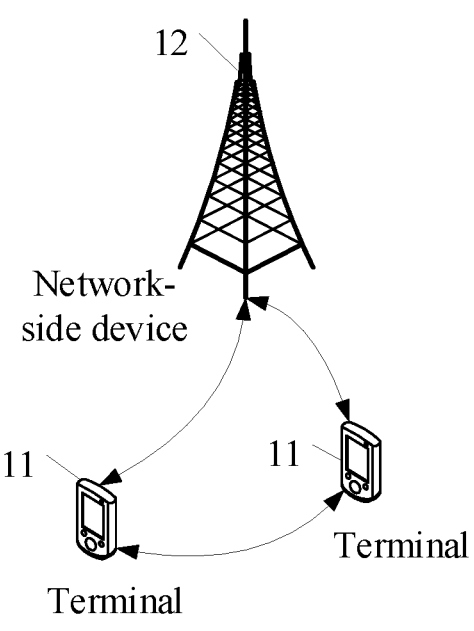

Network-
side device 11                              11

Terminal

Terminal

FIG. 1

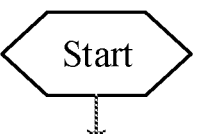

Start

Receive RS measurement indication information sent by a network-
side device, where the RS measurement indication information is
used to indicate that the terminal performs layer 1 beam
measurement for an RS of a first cell

201

Perform the layer 1 beam measurement for the RS of the first cell
based on the RS measurement indication information, where the
terminal performs scheduling restriction and/or rate matching on a
second cell when performing the layer 1 beam measurement for the
RS of the first cell

202

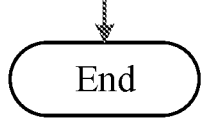

End

FIG. 2

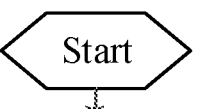
Send RS measurement indication information to a terminal, where the RS measurement indication information is used to indicate that the terminal performs layer 1 beam measurement for an RS of a first cell and performs scheduling restriction and/or rate matching on a second cell ⌐ 301
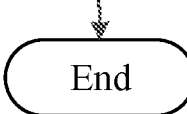
FIG. 3
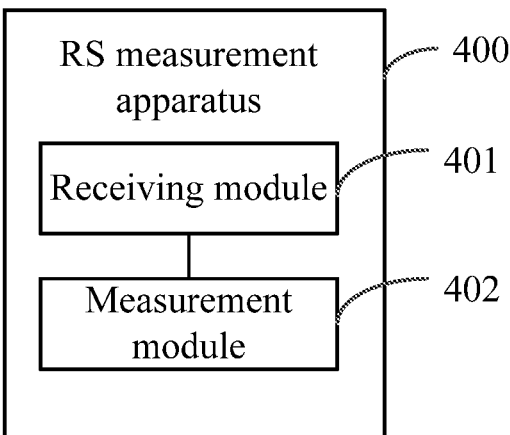
FIG. 4
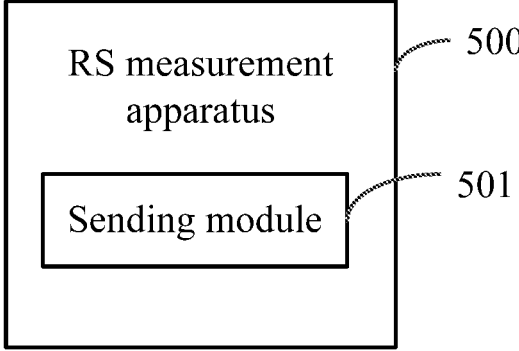
FIG. 5

RS MEASUREMENT METHOD AND APPARATUS, AND COMMUNICATIONS DEVICE

CROSS-REFERENCE TO RELATED APPLICATIONS

This application is a continuation of International Application No. PCT/CN2021/111297, filed on Aug. 6, 2021, which claims priority to Chinese Patent Application No. 202010785219.2 filed on Aug. 6, 2020. The entire contents of each of the above-referenced applications are expressly incorporated herein by reference.

TECHNICAL FIELD

This application belongs to the field of wireless communication technologies, and specifically relates to a Reference Signal (RS) measurement method and apparatus, and a communications device.

BACKGROUND

In a communications system, an existing layer 1 measurement technology is mainly used for measuring RSs of a local cell. However, an RS of a neighboring cell is usually measured at layer 3, and a measurement result is reported through layer 3, which leads to poor mobility management of the communications system, and goes against inter-cell management.

SUMMARY

Embodiments of this application provide an RS measurement method and apparatus, and a communications device.

According to a first aspect, an RS measurement method is provided. The method is performed by a terminal and includes:

receiving RS measurement indication information sent by a network-side device, where the RS measurement indication information is used to indicate that the terminal performs layer 1 beam measurement for an RS of a first cell; and performing the layer 1 beam measurement for the RS of the first cell based on the RS measurement indication information, where the terminal performs scheduling restriction and/or rate matching on a second cell when performing the layer 1 beam measurement for the RS of the first cell.

According to a second aspect, an RS measurement method is provided. The method is performed by a network-side device and includes:

sending RS measurement indication information to a terminal, where the RS measurement indication information is used to indicate that the terminal performs layer 1 beam measurement for an RS of a first cell and performs scheduling restriction and/or rate matching on a second cell.

According to a third aspect, an RS measurement apparatus is provided. The apparatus includes:

a receiving module, configured to receive RS measurement indication information sent by a network-side device, where the RS measurement indication information is used to indicate that a terminal performs layer 1 beam measurement for an RS of a first cell; and a measurement module, configured to perform the layer 1 beam measurement for the RS of the first cell based on the RS measurement indication information, where the terminal performs scheduling restriction and/or rate matching on a second cell when performing the layer 1 beam measurement for the RS of the first cell.

According to a fourth aspect, an RS measurement apparatus is provided. The apparatus includes:

a sending module, configured to send RS measurement indication information to a terminal, where the RS measurement indication information is used to indicate that the terminal performs layer 1 beam measurement for an RS of a first cell and performs scheduling restriction and/or rate matching on a second cell.

According to a fifth aspect, a communications device is provided. The communications device includes a processor, a memory, and a program or instructions stored in the memory and executable by the processor. When the program or instructions are executed by the processor, the steps of the method according to the first aspect or the steps of the method according to the second aspect are implemented.

According to a sixth aspect, a readable storage medium is provided. The readable storage medium stores a program or instructions. When the program or instructions are executed by a processor, the steps of the method according to the first aspect or the steps of the method according to the second aspect are implemented.

According to a seventh aspect, a chip is provided. The chip includes a processor and a communications interface, where the communications interface is coupled to the processor, and the processor is configured to run a program or instructions of a network-side device to implement the method according to the first aspect or the method according to the second aspect.

In the embodiments of this application, a terminal receives RS measurement indication information sent by a network-side device, and performs layer 1 beam measurement for an RS of a first cell based on the RS measurement indication information. In addition, when performing the layer 1 beam measurement for the RS of the first cell, the terminal performs scheduling restriction and/or rate matching on a second cell, to coordinate interference between the cells. Therefore, a capacity of a communications system can be increased, which facilitates mobility management of the communications system.

BRIEF DESCRIPTION OF DRAWINGS

FIG. 1 is a block diagram of a wireless communications system to which an embodiment of this application is applicable;

FIG. 2 is a flowchart of an RS measurement method according to an embodiment of this application;

FIG. 3 is a flowchart of another RS measurement method according to an embodiment of this application;

FIG. 4 is a structural diagram of an RS measurement apparatus according to an embodiment of this application;

FIG. 5 is a structural diagram of another RS reporting apparatus according to an embodiment of this application;

DETAILED DESCRIPTION

Figure 6:
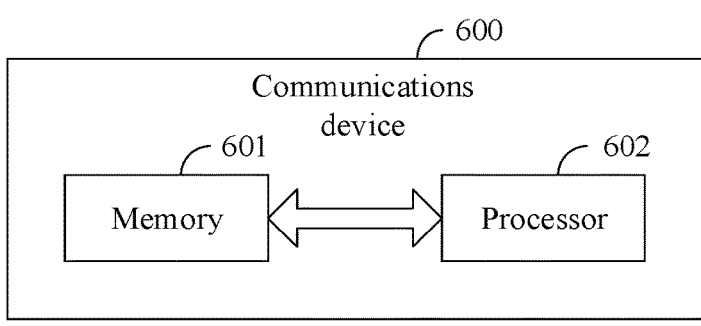
FIG. 6 is a structural diagram of a communications device according to an embodiment of this application.

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in the specification and claims of this application are used to distinguish between similar objects instead of describing a specific order or sequence. It should be understood that, termed used in such a way is interchangeable in proper circumstances, so that the embodiments of this application can be implemented in an order other than the order illustrated or described herein. Objects classified by "first" and "second" are usually of a same type, and the quantity of objects is not limited. For example, there may be one or more first objects. In addition, in the specification and the claims, "and/or" represents at least one of connected objects, and a character "/" generally represents an "or" relationship between associated objects.

It should be noted that the technology described in the embodiments of this application is not limited to the Long Term Evolution (LTE) or LTE-Advanced (LTE-A) system, and may also be applied to various wireless communications systems, for example, Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and other systems. The terms "system" and "network" in the embodiments of this application may be used interchangeably. The described technologies can be applied to both the systems and the radio technologies mentioned above as well as to other systems and radio technologies. However, a New Radio (NR) system is described in the following description for illustrative purposes, and the NR terminology is used in most of the following description, although these technologies can also be applied to applications other than the NR system application, such as the 6th Generation (6G) communications system.

An FR1 frequency band and an FR2 frequency band are mentioned in this application. A frequency range of the FR1 frequency band is 450 MHz to 6 GHz, also known as the sub-6 GHz frequency band; and the frequency range of the FR2 frequency band is 24.25 GHz to 52.6 GHz, which is usually referred to as millimeter wave (mmWave). FR2 in this application not only refers to the frequency range of 24.25 GHz to 52.6 GHz in a narrow sense, but also refers to other possible frequency ranges higher than FR1. For example, FR2 in this application may also refer to FR3, FR4, and higher frequency bands. FIG. 1 is a block diagram of a wireless communications system to which embodiments of this application can be applied. The wireless communications system includes a terminal 11 and a network-side device 12. The terminal 11 may also be referred to as a terminal device or User Equipment (UE). The terminal 11 may be a mobile phone, a tablet personal computer (Tablet Personal Computer), a laptop computer or referred to as a notebook computer, a Personal Digital Assistant (PDA), a palmtop computer, a netbook, an Ultra-Mobile Personal Computer (UMPC), a Mobile Internet Device (MID), a wearable device or a Vehicle-UE (VUE), a Pedestrian-UE (PUE), or another terminal-side device. The wearable device includes a wristband, an earphone, glasses, and the like. It should be noted that a specific type of the terminal 11 is not limited in the embodiments of this application. The network-side device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a WiFi node, a Transmission and Reception Point (TRP), or other appropriate terms in the art, provided that the same technical effects are achieved. The base station is not limited to specific technical terminology. It should be noted that in the embodiments of this application, a base station in the NR system is merely used as an example, which does not limit a specific type of the base station.

With reference to the accompanying drawings, the following describes in detail the RS measurement method in the embodiments of this application based on specific embodiments and application scenarios thereof.

Referring to FIG. 2 which is a flowchart of an RS measurement method according to an embodiment of this application, the RS measurement method is applied to a terminal. As shown in FIG. 2, the RS measurement method includes the following steps.

Step 201: Receive RS measurement indication information sent by a network-side device, where the RS measurement indication information is used to indicate that the terminal performs layer 1 beam measurement for an RS of a first cell.

It should be noted that when performing the beam measurement, the terminal determines a Reference Signal resource set, for example, an RS resource set configured by a network-side device and including at least one reference signal. IN some embodiments, the RS includes at least one of the following: a Synchronization Signal and PBCH block (SSB), a Channel State Information Reference Signal (CSI-RS), a Sounding Reference Signal (TRS), and a Tracking Reference Signal (TRS).

It should be noted that, among the foregoing reference signals, the SSB, the CSI-RS, and the TRS are all downlink reference signals, and the SRS is an uplink reference signal.

In some embodiments, the CSI-RS is a CSI-RS used for mobility measurement, and may also be referred to as a CSI-RS for mobility in some implementations; and the SRS is an SRS used for positioning, and may also be referred to as an SRS for positioning or as a Positioning Reference Signal (PRS) in some implementations.

In this embodiment of this application, the Layer 1 (L1) beam measurement includes at least one of the following:

L1 Reference Signal Received Power (L1-RSRP) measurement;

L1 Signal-to-noise and Interference Ratio (L1-SINR) measurement;

L1 Reference Signal Received Quality (L1-RSRQ) measurement;

beam failure measurement for beam failure recovery; and candidate beam measurement for beam failure recovery.

For example, the terminal may measure the L1-RSRP and/or L1-SINR and/or L1-RSRQ of each reference signal, and reports at least one optimal measurement result to the network-side device. Report content may include an SSB Resource Indicator (SSBRI), a CSI-RS Resource Indicator (CRI), an SRS Resource Indicator (SRI), an SSB index, a CSI-RS index, or an SRS index, and include L1-RSRP, L1-SINR, or L1-RSRQ. The report content reflects at least one optimal beam and quality thereof, which can be used by the network-side device to determine a beam that is used to send a channel or a signal to the terminal.

Step 202: Perform the layer 1 beam measurement for the RS of the first cell based on the RS measurement indication information, where the terminal performs scheduling restriction and/or rate matching on a second cell when performing the layer 1 beam measurement for the RS of the first cell.

It should be noted that, the scheduling restriction and/or rate matching is determined based on any one of the following:

configuration information sent by the network-side device; and a protocol stipulation.

In other words, the terminal may perform scheduling restriction and/or rate matching based on the configuration information sent by the network-side device; or it may be stipulated in a protocol that a terminal performs scheduling restriction and/or rate matching on a second cell when performing layer 1 beam measurement for an RS of a first cell.

In this embodiment of this application, the first cell and the second cell include at least one of the following:

the first cell is a serving cell of the terminal, and the second cell is a neighboring cell;

the first cell is a neighboring cell, and the second cell is a serving cell of the terminal;

the first cell is a neighboring cell, and the second cell is a neighboring cell the same as the first cell; and the first cell is a neighboring cell, and the second cell is a neighboring cell different from the first cell.

It should be noted that the neighboring cell may be a neighboring TRP; or in other words, the neighboring cell includes a neighboring TRP. The serving cell and the neighboring cell may be distinguished based on cell identification information such as a Physical Cell Identifier (PCI), a CORESET pool index, a TRP Identifier (TRP ID), and cell identifiers of other types.

In some embodiments, a Downlink transmission (DL), an Uplink transmission (UL), and an RS of the neighboring cell may indicate the following: Related identification information such as the PCI, the TRP ID or the CORESET pool index of the neighboring cell is configured; a Transmission Configuration Indicator (TCI), space-related information, and Quasi Co-Location (QCL) information of the neighboring cell are reference information of the neighboring cell; a TCI, space-related information, or QCL information of Downlink Control Information (DCI), a CORESET, or a control channel that schedules a channel or a signal is an RS of the neighboring cell or belongs to the RS of the neighboring cell; or the DCI, the CORESET, or the control channel that schedules the channel or the signal belongs to the neighboring cell.

In this embodiment of this application, a terminal receives RS measurement indication information sent by a network-side device, and performs layer 1 beam measurement for an RS of a first cell based on the RS measurement indication information. In addition, when performing the layer 1 beam measurement for the RS of the first cell, the terminal performs scheduling restriction and/or rate matching on a second cell, to coordinate interference between the cells. Therefore, a capacity of a communications system can be increased, which facilitates mobility management of the communications system.

It should be noted that the scheduling restriction on the second cell includes downlink scheduling restriction and uplink scheduling restriction. The downlink scheduling restriction may be a restriction on scheduling of a downlink signal and/or a downlink channel; and the uplink scheduling restriction may be a restriction on scheduling of an uplink signal and/or an uplink channel.

In some embodiments, the downlink scheduling restriction is applicable to at least one of downlink channels and downlink signals such as a Physical Downlink Control Channel (PDCCH), a Physical Downlink Shared Channel (PDSCH), a TRS, a CSI-RS, and an SSB.

The uplink scheduling restriction is applicable to at least one of uplink channels and uplink signals such as a Physical Uplink Control Channel (PUCCH), a Physical Uplink Shared Channel (PUSCH), an SRS, and a Physical Random Access Channel (PRACH).

The downlink scheduling restriction may be a restriction on transmission and/or sending of at least one of a downlink channel and a downlink signal of the second cell; and the uplink scheduling restriction may be a restriction on transmission and/or sending of at least one of an uplink channel and an uplink signal of the second cell.

In this embodiment of this application, a restriction interval of the scheduling restriction includes a first interval, where the first interval is determined based on a symbol where the RS of the first cell is located. In some implementations, the symbol may also be referred to as an Orthogonal Frequency Division Multiplex (OFDM) symbol.

In some embodiments, the restriction interval may further include at least one of a second interval, a third interval and a fourth interval, where the second interval is determined based on the symbol where the RS of the first cell is located and K symbols before the symbol, where K is a positive integer; the third interval is determined based on the symbol where the RS of the first cell is located and L symbols behind the symbol, where L is a positive integer; and the fourth interval is determined based on the symbol where the RS of the first cell is located, the K symbols before the symbol, and the L symbols behind the symbol. In some embodiments, a value of K is 1; and a value of L is 1.

For example, if the symbol where the RS of the first cell is located is a target symbol, the second interval is determined based on the target symbol and K symbols before the target symbol; the third interval is determined based on the target symbol and L symbols behind the target symbol; and the fourth interval is determined based on the target symbol, the K symbols before the target symbol, and the L symbols behind the target symbol. The values of M and N may be the same or different.

It should be noted that in the foregoing restriction interval, an SS/PBCH block Measurement Timing Configuration (SMTC) is not restricted; the foregoing restriction interval is in SMTC window duration; or different selection can be made based on whether the foregoing restriction interval is in the SMTC window duration. For example, when the symbol where the RS of the first cell is located is within the SMTC, the restriction interval is the fourth interval; and when the symbol where the RS of the first cell is located is out of the SMTC, the restriction interval is the first interval, the second interval, or the third interval. In some alternative embodiments, when the symbol where the RS of the first cell is located is within the SMTC, the restriction interval is the first interval, the second interval, or the third interval; and when the symbol where the RS of the first cell is located is out of the SMTC, the restriction interval is the fourth interval. The foregoing SMTC is for SSBs. In some embodiments, similar behavior is also applicable for CSI-RSs and SRSs. In other words, for CSI-RSs, only replacing the SMTC in the foregoing description with CSI-RS Measurement Timing Configuration (CMTC) is required; and for SRSs, only replacing the SMTC in the foregoing description with SRS measurement timing configuration is required. The CSI-RS and the SRS may also determine measurement time configuration based on the SMTC or based on other reference signals. The determining measurement time configuration based on the SMTC may be: directly using the SMTC as the measurement time configuration, or using a linearly processing result of the SMTC as the measurement time configuration, for example, a*SMTC+b, where a is a decimal and b is a decimal or an integer. In some embodiments, a=1; and b may be a negative number or a positive number. All content that involves SSB and SMTC and that is in the following can be extended to CSI-RS and CMTC, as well as to SRS and SRS measurement timing configuration. Details are not described below again.

In some embodiments, in a case that the first cell and the second cell have different Subcarrier Spacing (SCS), the restriction interval satisfies any of the following:

the restriction interval is calculated based on a symbol of the first cell;

the restriction interval is calculated based on a symbol of the second cell; and the first interval is calculated based on the symbol of the first cell, and at least one of the second interval, the third interval, and the fourth interval is calculated based on the symbol of the second cell.

For example, in a first implementation, all of the foregoing four restriction intervals may be calculated based on the symbol of the first cell; in a second implementation, all of the foregoing four restriction intervals may be calculated based on the symbol of the second cell; or in a third implementation, a symbol where an RS of the first interval is located is calculated based on the symbol of the first cell, and first K symbols and/or last L symbols in each of the second interval, the third interval, and the fourth interval are calculated based on the symbol of the second cell.

In this embodiment of this application, at least one of a value of K and a value of L is determined based on a difference between timing of the first cell and timing of the second cell. In other words, the difference between the timing of the first cell and the timing of the second cell may affect the values of K and L, and further affect calculation of the second interval, the third interval, and the fourth interval. As a result, determining of the restriction interval is affected. The timing herein may be downlink timing, or may be uplink timing. For example, the timing is the downlink timing. In this case, if a base station of the first cell and a base station of the second cell send channels at the same time, signals of the first cell and the second cell may not reach the terminal at the same time due to factors such as spatial propagation of wireless signals and device errors. There is a time difference therebetween, namely, the foregoing difference between the timing of the first cell and the timing of the second cell.

In some embodiments, in a case that the timing of the second cell is earlier than the timing of the first cell, the restriction interval is at least one of the first interval and second interval;

in a case that the timing of the second cell is later than the timing of the first cell, the restriction interval is at least one of the first interval and the third interval; or in a case that any preset condition is unsatisfied, the restriction interval is at least one of the first interval, the second interval, the third interval, and the fourth interval, where the preset condition includes at least one of the following:

the terminal has measured timing of the first cell;

the terminal has measured timing of the second cell;

the terminal has measured a difference between the timing of the first cell and the timing of the second cell;

the terminal has reported the timing of the first cell;

the terminal has reported the timing of the second cell;

the terminal has reported the difference between the timing of the first cell and the timing of the second cell;

the terminal has reported a timing requirement for the first cell;

the terminal has reported a timing requirement for the second cell;

the terminal has reported a requirement for the difference between the timing of the first cell and the timing of the second cell;

configuration information received by the terminal indicates the timing of the first cell;

the configuration information received by the terminal indicates the timing of the second cell;

the configuration information received by the terminal indicates the difference between the timing of the first cell and the timing of the second cell;

the configuration information received by the terminal indicates the timing requirement for the first cell;

the configuration information received by the terminal indicates the timing requirement for the second cell; and the configuration information received by the terminal indicates the requirement for the difference between the timing of the first cell and the timing of the second cell.

For example, a case in which the preset condition is unsatisfied may be: the terminal has not reported the timing of the second cell, or has not reported the timing difference between the second cell and the first cell; the network-side device has not configured the requirement for the timing difference between the first cell and the second cell; or the terminal has not received configuration information that is configured by the network-side device for indicating the timing requirement for the second cell or the first cell. For another example, the case in which the preset condition is unsatisfied may be: the network-side device has configured the requirement for the timing difference between the first cell and the second cell, but the terminal has not reported the timing difference between the second cell and the first cell. In some embodiments, the above difference requirement may be a threshold of the difference, that is, the timing difference between the first cell and the second cell should be less than or equal to the threshold.

In this embodiment of this application, the scheduling restriction on the second cell may vary depending on a frequency band accessed by the terminal, an SCS of the first cell, an SCS of the second cell, and the like. The following describes the scheduling restriction on the second cell.

In a first implementation, in a case that a frequency band accessed by the terminal is FR1, and the SCS of the first cell is the same as the SCS of the second cell, if the RS of the first cell is a downlink RS, the second cell satisfies at least one of the following: the restriction interval has a scheduling restriction on a UL of the second cell, and the restriction interval has no scheduling restrictions on a DL of the second cell.

The restriction interval may be determined according to the foregoing method. For example, in a case that the timing of the second cell is earlier than the timing of the first cell, the restriction interval is the first interval and/or the second interval. For another example, in a case that the timing of the second cell is later than the timing of the first cell, the restriction interval is at least one of the first interval and/or the third interval. The restriction interval may also be other cases, which are not be described herein.

In a second implementation, in a case that a frequency band accessed by the terminal is FR1, and the SCS of the first cell is the same as the SCS of the second cell, if the RS of the first cell is an uplink RS, the second cell satisfies at least one of the following: the restriction interval has no scheduling restrictions on the uplink transmission of the second cell, and the restriction interval has a scheduling restriction on the downlink transmission of the second cell.

In a third implementation, a frequency band accessed by the terminal is FR1, and a first preset condition is satisfied. The first preset condition is: the SCS of the first cell is different from the SCS of the second cell, and the terminal is capable of simultaneously transmitting at least one of data, SSBs and RSs of different parameter sets (Numerology). In this case, if the RS of the first cell is a downlink RS, the second cell satisfies at least one of the following: the restriction interval has a scheduling restriction on an uplink transmission of the second cell, and the restriction interval has no scheduling restrictions on a downlink transmission of the second cell. It should be noted that a case in which the terminal is capable of transmitting at least two of data, SSBs, and RSs of different parameter sets may be: the terminal is capable of simultaneously transmitting at least two of data, SSBs, and RSs of different parameter sets simultaneously. Details are not described below.

In a fourth implementation, a frequency band accessed by the terminal is FR1, and a first preset condition is satisfied. The first preset condition is: the SCS of the first cell is different from the SCS of the second cell, and the terminal is capable of simultaneously transmitting at least one of data, SSBs and RSs of different parameter sets (Numerology). In this case, if the RS of the first cell is an uplink RS, the second cell satisfies at least one of the following: the restriction interval has no scheduling restrictions on the uplink transmission of the second cell, and the restriction interval has a scheduling restriction on the downlink transmission of the second cell.

In a fifth implementation, a frequency band accessed by the terminal is FR1, and a second preset condition is satisfied. The second preset condition is: the SCS of the first cell is different from the SCS of the second cell, the terminal is incapable of simultaneously transmitting at least one of data, SSBs and RSs of different parameter sets, and the RS of the first cell is an uplink RS or a downlink RS. In this case, the second cell satisfies at least one of the following: the restriction interval has a scheduling restriction on an uplink transmission of the second cell, and the restriction interval has a scheduling restriction on a downlink transmission of the second cell. In this implementation, when the frequency band accessed by the terminal is FR1 and the second preset condition is satisfied, the uplink transmission and/or the downlink transmission of the second cell have/has scheduling restrictions, no matter whether the RS of the first cell is an uplink RS or a downlink RS. It should be noted that a case in which the terminal is incapable of transmitting at least two of data, SSBs, and RSs of different parameter sets may be: the terminal is unable to simultaneously transmit at least two of data, SSBs, and RSs of different parameter sets simultaneously. Details are not described below.

In a sixth implementation, in a case that a frequency band accessed by the terminal is FR2, the second cell includes at least one of an uplink scheduling restriction and a downlink scheduling restriction in the restriction interval. In other words, when the frequency band accessed by the terminal is FR2, the restriction interval has a scheduling restriction on the second cell, no matter what the conditions are, where the scheduling restriction includes an uplink scheduling restriction and/or a downlink scheduling restriction. In some embodiments, FR2 may be FR3, FR4, or another frequency band higher than FR1. Details are not described again in content that involves FR2 and that is in the following.

In a seventh implementation, in a case that a frequency band accessed by the terminal is FR2, a scheduling restriction on the second cell in the restriction interval is determined based on at least one of the following:

a QCL RS of the RS of the first cell is different from at least one of an uplink QCL RS and a downlink QCL RS of the second cell;

the RS of the first cell is an SSB; and a resource set where the RS of the first cell is located is configured with a repetition.

For example, when the frequency band accessed by the terminal is FR2, and the reference signal of the first cell is an SSB, the restriction interval has an uplink scheduling restriction and/or a downlink scheduling restriction on the second cell. In some alternative embodiments, when the frequency band accessed by the terminal is FR2, if the second cell performs an uplink transmission, the restriction interval has an uplink scheduling restriction on the second cell in case that a QCL RS of the reference signal of the first cell is different from an uplink QCL RS of the second cell; or if the second cell performs a downlink transmission, the restriction interval has a downlink scheduling restriction on the second cell in a case that a QCL RS of the reference signal of the first cell is different from a downlink QCL RS of the second cell.

In addition, it should be noted that the resource set where the RS of the first cell is located being configured with a repetition may be: the resource set where the RS of the first cell is located is configured with the signaling repetition; or the resource set where the RS of the first cell is located is configured with the signaling repetition and the signaling is configured as On. For example, the signaling may include configuration content "with repetition On".

In an eighth implementation, in a case that a frequency band accessed by the terminal is FR2, the second cell being free from the scheduling restriction is determined based on at least one of the following:

a QCL RS of the RS of the first cell is the same as at least one of an uplink QCL RS and a downlink QCL RS of the second cell;

the RS of the first cell is any one of a CSI-RS, a TRS, and an SRS; and a resource set where the RS of the first cell is located has no repetitions.

For example, when a frequency band accessed by the terminal is FR2, the second cell may be free from the scheduling restriction. For example, the QCL RS of the reference signal of the first cell is the same as the uplink QCL RS of the second cell, or the same as the downlink QCL RS of the second cell; or the RS of the first cell is a CSI-RS, a TRS, or an SRS.

It should be noted that the resource set where the RS of the first cell is located having no repetitions may be: the resource set of the first cell is not configured with the signaling repetition; or the resource set of the first cell is configured with the signaling repetition but the signaling is configured as Off, for example, the signaling may include configuration content "with repetition Off".

In this embodiment of this application, the scheduling restriction on the second cell may vary depending on a frequency band accessed by the terminal, an SCS of the first cell, an SCS of the second cell, and the like, so that the scheduling restriction on the second cell is more flexible, which better facilitates mobility management of a communications system.

In some embodiments, the terminal may also perform rate matching on a second cell when performing the layer 1 beam measurement for the RS of the first cell.

In this embodiment of this application, the rate matching includes: in a case that a target time domain resource of the second cell is within the restriction interval, a target frequency domain resource is unavailable for a target transmission, where the target transmission is at least one of an uplink transmission of the second cell and a downlink transmission of the second cell, and the target frequency domain resource is a frequency domain resource containing a transmission resource of the RS of the first cell.

For example, when the uplink transmission of the second cell is within the restriction interval, the terminal may consider that frequency domain resources including a transmission resource of the reference signal of the first cell are unavailable for the uplink transmission of the second cell; or when the downlink transmission of the second cell is within the restriction interval, the terminal may consider that frequency domain resources including a transmission resource of the reference signal of the first cell are unavailable for the downlink transmission of the second cell.

The reference signal of the first cell may be an SSB of the first cell, and the target transmission of the second cell may be a transmission of a PDSCH of the second cell.

In some embodiments, the rate matching is performed on the second cell in a case that at least one of an uplink transmission and a downlink transmission of the second cell is free from a scheduling restriction or at least one of the uplink transmission and the downlink transmission of the second cell is allowed within the restriction interval. In other words, when the uplink transmission and/or the downlink transmission of the second cell have/has no scheduling restrictions, or when the uplink transmission and/or the downlink transmission of the second cell are/is allowed in the restriction interval, the target frequency domain resource is unavailable for the uplink transmission and/or the downlink transmission of the second cell in a case that the target time domain resource of the second cell is within the restriction interval.

In this embodiment of this application, in a case that the SCS of the first cell is different from the SCS of the second cell or a parameter set (Numerology) of the first cell is different from a parameter set of the second cell, a time domain resource and a frequency domain resource of one of the first cell and the second cell are calculated through conversion based on the SCS or parameter sets by taking the other cell as a reference, so as to perform rate matching on at least one of an uplink transmission and a downlink transmission of the second cell. For example, the parameter set of the first cell is different from the parameter set of the second cell. A time domain resource and a frequency domain resource of the first cell are calculated through conversion based on the SCS or the parameter sets by taking the second cell as a reference, to obtain a time domain resource and a frequency domain resource from the parameter set of the second cell. Then, rate matching is performed on the downlink transmission of the second cell.

It should be noted that, in a case that the downlink transmission of the second cell is a PDSCH, the PDSCH may be Cyclic Redundancy Check (CRC) scrambled by at least one of the following: a Random Access Radio Network Temporary Identity (RA-RNTI), a Message B (MsgB)

RNTI, a Paging RNTI (P-RNTI), a Temporary Cell RNTI (TC-RNTI), a Cell RNTI (C-RNTI), a Configured Scheduling RNTI (CS-RNTI), a Modulation and Coding Scheme Cell RNTI (MCS-C-RNTI), and a semi-persistent scheduling PDSCH. MsgB-RNTI is used for random access.

In addition, it should be noted that, for determining of a position of the RS of the first cell, in a case that the first cell is a serving cell of the terminal, a position of an SSB of the serving cell may be obtained based on a field ssb-PositionsInBurst, where ssb-PositionsInBurst is a position of an SSB in a cluster. Generally, a base station periodically sends SSB clusters. One SSB cluster includes a plurality of SSBs. A position of an SSB in the cluster is a number in which the SSB is located in the plurality of SSBs. In a case that the first cell is a neighboring cell, a position of an SSB of the neighboring cell may be inferred from an SSB period and ssb-PositionsInBurst that are configured by the network-side device, to infer all SSB positions and periods of the neighboring cell. The SSB period may be configured in serving cell configuration ServingCellConfig or serving cell common configuration ServingCellConfigCommon in the serving cell or the neighboring cell, or configured in serving cell common configuration ServingCellConfigCommonSLB in a system information block. If the SSB period is configured in a serving cell, PCI, CORESETPoolIndex, TRP ID, and other cell identification information of the neighboring cell also need to be configured.

In the solution provided in this embodiment of this application, a terminal receives RS measurement indication information sent by a network-side device, and performs layer 1 beam measurement for an RS of a first cell based on the RS measurement indication information. In addition, when performing the layer 1 beam measurement for the RS of the first cell, the terminal performs scheduling restriction and/or rate matching on a second cell, to coordinate interference between the cells. Therefore, a capacity of a communications system can be increased, which facilitates mobility management of the communications system and improves users' experience.

Referring to FIG. 3 which is a flowchart of an RS measurement method according to an embodiment of this application, the RS measurement method is applied to a network-side device.

As shown in FIG. 3, the RS measurement method includes the following step.

Step 301: Send RS measurement indication information to a terminal, where the RS measurement indication information is used to indicate that the terminal performs layer 1 beam measurement for an RS of a first cell and performs scheduling restriction and/or rate matching on a second cell.

In some embodiments, the first cell and the second cell include at least one of the following:

the first cell is a serving cell of the terminal, and the second cell is a neighboring cell;

the first cell is a neighboring cell, and the second cell is a serving cell of the terminal;

the first cell is a neighboring cell, and the second cell is a neighboring cell the same as the first cell; and the first cell is a neighboring cell, and the second cell is a neighboring cell different from the first cell.

In some embodiments, the RS includes at least one of the following:

a synchronization signal and PBCH block SSB, a channel state information reference signal CSI-RS, a sounding reference signal SRS, and a tracking reference signal TRS.

Among the foregoing reference signals, the SSB, the CSI-RS, and the TRS are all downlink reference signals, and the SRS is an uplink reference signal.

It should be noted that, concepts of uplink and downlink in this embodiment of this application are the same as those in the embodiment shown in FIG. 2. Details are not repeated below.

In some embodiments, the CSI-RS is a CSI-RS used for mobility measurement, and the SRS is an SRS used for positioning.

In some embodiments, the layer 1 beam measurement includes at least one of the following:

layer 1 reference signal received power RSRP measurement;

layer 1 signal-to-noise and interference ratio SINR measurement;

layer 1 reference signal received quality RSRQ measurement;

beam failure measurement for beam failure recovery; and candidate beam measurement for beam failure recovery.

In some embodiments, the scheduling restriction on the second cell includes downlink scheduling restriction and uplink scheduling restriction.

In some embodiments, a restriction interval of the scheduling restriction includes:

a first interval, where the first interval is determined based on a symbol where the RS of the first cell is located.

In some embodiments, the restriction interval further includes at least one of a second interval, a third interval and a fourth interval, where the second interval is determined based on the symbol where the RS of the first cell is located and K symbols before the symbol, where K is a positive integer;

the third interval is determined based on the symbol where the RS of the first cell is located and L symbols behind the symbol, where L is a positive integer; and the fourth interval is determined based on the symbol where the RS of the first cell is located, the K symbols before the symbol, and the L symbols behind the symbol.

In some embodiments, in a case that the first cell and the second cell have different subcarrier spacing SCS, the restriction interval satisfies at least one of the following:

the restriction interval is calculated based on a symbol of the first cell;

the restriction interval is calculated based on a symbol of the second cell; and the first interval is calculated based on the symbol of the first cell, and at least one of the second interval, the third interval, and the fourth interval is calculated based on the symbol of the second cell.

In some embodiments, at least one of a value of K and a value of L is determined based on a difference between timing of the first cell and timing of the second cell.

In some embodiments, in a case that the timing of the second cell is earlier than the timing of the first cell, the restriction interval is at least one of the first interval and the second interval; or in a case that the timing of the second cell is later than the timing of the first cell, the restriction interval is at least one of the first interval and the third interval.

In some embodiments, in a case that any preset condition is unsatisfied, the restriction interval is at least one of the first interval, the second interval, the third interval, and the fourth interval, where the preset condition includes at least one of the following:

timing of the first cell reported by the terminal has been received;

timing of the second cell reported by the terminal has been received;

a difference between the timing of the first cell and the timing of the second cell that is reported by the terminal has been received;

a timing requirement for the first cell reported by the terminal has been received;

a timing requirement for the second cell reported by the terminal has been received;

a requirement for the difference between the timing of the first cell and the timing of the second cell that is reported by the terminal has been received;

the timing of the first cell has been indicated;

the timing of the second cell has been indicated;

the difference between the timing of the first cell and the timing of the second cell has been indicated;

the timing requirement for the first cell has been indicated;

the timing requirement for the second cell has been indicated; and the requirement for the difference between the timing of the first cell and the timing of the second cell has been indicated.

In some embodiments, in a case that a frequency band accessed by the terminal is FR1, and the SCS of the first cell is the same as the SCS of the second cell, if the RS of the first cell is a downlink RS, the scheduling restriction on the second cell satisfies at least one of the following: the restriction interval has a scheduling restriction on an uplink transmission of the second cell, and the restriction interval has no scheduling restrictions on a downlink transmission of the second cell; or if the RS of the first cell is an uplink RS, the scheduling restriction on the second cell satisfies at least one of the following: the restriction interval has no scheduling restrictions on the uplink transmission of the second cell, and the restriction interval has a scheduling restriction on the downlink transmission of the second cell.

In some embodiments, in a case that a frequency band accessed by the terminal is FR1, and a first preset condition is satisfied, if the RS of the first cell is a downlink RS, the scheduling restriction on the second cell satisfies at least one of the following: the restriction interval has a scheduling restriction on an uplink transmission of the second cell, and the restriction interval has no scheduling restrictions on a downlink transmission of the second cell; or if the RS of the first cell is an uplink RS, the scheduling restriction on the second cell satisfies at least one of the following: the restriction interval has no scheduling restrictions on the uplink transmission of the second cell, and the restriction interval has a scheduling restriction on the downlink transmission of the second cell, where the first preset condition is: the SCS of the first cell is different from the SCS of the second cell, and the terminal is capable of simultaneously transmitting at least one of data, SSBs and RSs of different parameter sets.

In some embodiments, in a case that a frequency band accessed by the terminal is FR1, and a second preset condition is satisfied, the second cell satisfies at least one of the following: the restriction interval has a scheduling restriction on an uplink transmission of the second cell, and the restriction interval has a scheduling restriction on a downlink transmission of the second cell, where the second preset condition is: the SCS of the first cell is different from the SCS of the second cell, the terminal is incapable of simultaneously transmitting at least one of data, SSBs and RSs of different parameter sets, and the RS of the first cell is an uplink RS or a downlink RS.

In some embodiments, in a case that a frequency band accessed by the terminal is FR2, the second cell includes at least one of an uplink scheduling restriction and a downlink scheduling restriction in the restriction interval.

In some embodiments, in a case that a frequency band accessed by the terminal is FR2, a scheduling restriction on the second cell in the restriction interval is determined based on at least one of the following:

a quasi co-location reference signal QCL RS of the RS of the first cell is different from at least one of an uplink QCL RS and a downlink QCL RS of the second cell;

the RS of the first cell is an SSB; and a resource set where the RS of the first cell is located is configured with a repetition.

In some embodiments, in a case that a frequency band accessed by the terminal is FR2, the second cell being free from the scheduling restriction is determined based on at least one of the following:

a QCL RS of the RS of the first cell is the same as at least one of an uplink QCL RS and a downlink QCL RS of the second cell;

the RS of the first cell is any one of a CSI-RS, a TRS, and an SRS; and a resource set where the RS of the first cell is located has no repetitions.

In some embodiments, the rate matching includes: in a case that a target time domain resource of the second cell is within the restriction interval, a target frequency domain resource is unavailable for a target transmission, where the target transmission is at least one of an uplink transmission of the second cell and a downlink transmission of the second cell, and the target frequency domain resource is a frequency domain resource containing a transmission resource of the RS of the first cell.

In some embodiments, the RS of the first cell is an SSB of the first cell, and the target transmission is a transmission of a physical downlink shared channel PDSCH of the second cell.

In some embodiments, the RS measurement indication information is used to indicate that the terminal performs the rate matching on the second cell in a case that at least one of an uplink transmission and a downlink transmission of the second cell is free from a scheduling restriction or at least one of the uplink transmission and the downlink transmission of the second cell is allowed within the restriction interval.

In some embodiments, in a case that the SCS of the first cell is different from the SCS of the second cell or a parameter set of the first cell is different from a parameter set of the second cell, a time domain resource and a frequency domain resource of one of the first cell and the second cell are calculated through conversion based on the SCS or parameter sets by taking the other cell as a reference, so as to perform rate matching on at least one of an uplink transmission and a downlink transmission of the second cell.

It should be noted that the foregoing optional implementations and related concepts may be described with reference to specific descriptions in the embodiment of the RS measurement method shown in FIG. 2. Details are not described in this embodiment.

In the solution provided in this embodiment of this application, a network-side device sends RS measurement indication information to a terminal, so that the terminal is enabled to perform layer 1 beam measurement for an RS of a first cell and perform scheduling restriction and/or rate matching on a second cell based on the RS measurement indication information, thereby coordinating interference between the cells and increasing a capacity of a communications system. This better facilitates mobility management of the communications system and improves users' experience.

It should be noted that, the RS measurement method provided in this embodiment of this application may be performed by an RS measurement apparatus, or a control module that is in the RS measurement apparatus and that is used for performing the RS measurement method. In the embodiments of this application, the RS measurement method being performed by an RS measurement apparatus is used as an example to describe the RS measurement apparatus provided in the embodiments of this application.

Referring to FIG. 4 which is a structural diagram of an RS measurement apparatus according to an embodiment of this application, the RS measurement apparatus may be applied to a terminal. In some embodiments, the RS measurement apparatus further includes a processor. As shown in FIG. 4, the RS measurement apparatus 400 includes:

a receiving module 401, configured to receive RS measurement indication information sent by a network-side device, where the RS measurement indication information is used to indicate that a terminal performs layer 1 beam measurement for an RS of a first cell; and a measurement module 402, configured to perform the layer 1 beam measurement for the RS of the first cell based on the RS measurement indication information, where the terminal performs scheduling restriction and/or rate matching on a second cell when performing the layer 1 beam measurement for the RS of the first cell.

In some embodiments, the scheduling restriction and/or rate matching is determined based on any one of the following:

configuration information sent by the network-side device; and a protocol stipulation.

In some embodiments, the first cell and the second cell include at least one of the following:

the first cell is a serving cell of the terminal, and the second cell is a neighboring cell;

the first cell is a neighboring cell, and the second cell is a serving cell of the terminal;

the first cell is a neighboring cell, and the second cell is a neighboring cell the same as the first cell; and the first cell is a neighboring cell, and the second cell is a neighboring cell different from the first cell.

In some embodiments, the RS includes at least one of the following:

a synchronization signal and PBCH block SSB, a channel state information reference signal CSI-RS, a sounding reference signal SRS, and a tracking reference signal TRS.

In some embodiments, the CSI-RS is a CSI-RS used for mobility measurement, and the SRS is an SRS used for positioning.

In some embodiments, the layer 1 beam measurement includes at least one of the following:

layer 1 reference signal received power RSRP measurement;

layer 1 signal-to-noise and interference ratio SINR measurement;

layer 1 reference signal received quality RSRQ measurement;

beam failure measurement for beam failure recovery; and candidate beam measurement for beam failure recovery.

In some embodiments, the scheduling restriction on the second cell includes downlink scheduling restriction and uplink scheduling restriction.

In some embodiments, a restriction interval of the scheduling restriction includes:

a first interval, where the first interval is determined based on a symbol where the RS of the first cell is located.

In some embodiments, the restriction interval further includes at least one of a second interval, a third interval and a fourth interval, where the second interval is determined based on the symbol where the RS of the first cell is located and K symbols before the symbol, where K is a positive integer;

the third interval is determined based on the symbol where the RS of the first cell is located and L symbols behind the symbol, where L is a positive integer; and the fourth interval is determined based on the symbol where the RS of the first cell is located, the K symbols before the symbol, and the L symbols behind the symbol.

In some embodiments, in a case that the first cell and the second cell have different subcarrier spacing SCS, the restriction interval satisfies any of the following:

the restriction interval is calculated based on a symbol of the first cell;

the restriction interval is calculated based on a symbol of the second cell; and the first interval is calculated based on the symbol of the first cell, and at least one of the second interval, the third interval, and the fourth interval is calculated based on the symbol of the second cell.

In some embodiments, at least one of a value of K and a value of L is determined based on a difference between timing of the first cell and timing of the second cell.

In some embodiments, in a case that the timing of the second cell is earlier than the timing of the first cell, the restriction interval is at least one of the first interval and the second interval; or in a case that the timing of the second cell is later than the timing of the first cell, the restriction interval is at least one of the first interval and the third interval.

In some embodiments, in a case that any preset condition is unsatisfied, the restriction interval is at least one of the first interval, the second interval, the third interval, and the fourth interval, where the preset condition includes at least one of the following:

the terminal has measured timing of the first cell;

the terminal has measured timing of the second cell;

the terminal has measured a difference between the timing of the first cell and the timing of the second cell;

the terminal has reported the timing of the first cell;

the terminal has reported the timing of the second cell;

the terminal has reported the difference between the timing of the first cell and the timing of the second cell;

the terminal has reported a timing requirement for the first cell;

the terminal has reported a timing requirement for the second cell;

the terminal has reported a requirement for the difference between the timing of the first cell and the timing of the second cell;

configuration information received by the terminal indicates the timing of the first cell;

the configuration information received by the terminal indicates the timing of the second cell;

the configuration information received by the terminal indicates the difference between the timing of the first cell and the timing of the second cell;

the configuration information received by the terminal indicates the timing requirement for the first cell;

the configuration information received by the terminal indicates the timing requirement for the second cell; and the configuration information received by the terminal indicates the requirement for the difference between the timing of the first cell and the timing of the second cell.

In some embodiments, in a case that a frequency band accessed by the terminal is FR1, and the SCS of the first cell is the same as the SCS of the second cell, if the RS of the first cell is a downlink RS, the scheduling restriction on the second cell satisfies at least one of the following: the restriction interval has a scheduling restriction on an uplink transmission of the second cell, and the restriction interval has no scheduling restrictions on a downlink transmission of the second cell; or if the RS of the first cell is an uplink RS, the scheduling restriction on the second cell satisfies at least one of the following: the restriction interval has no scheduling restrictions on the uplink transmission of the second cell, and the restriction interval has a scheduling restriction on the downlink transmission of the second cell.

In some embodiments, in a case that a frequency band accessed by the terminal is FR1, and a first preset condition is satisfied, if the RS of the first cell is a downlink RS, the scheduling restriction on the second cell satisfies at least one of the following: the restriction interval has a scheduling restriction on an uplink transmission of the second cell, and the restriction interval has no scheduling restrictions on a downlink transmission of the second cell; or if the RS of the first cell is an uplink RS, the scheduling restriction on the second cell satisfies at least one of the following: the restriction interval has no scheduling restrictions on the uplink transmission of the second cell, and the restriction interval has a scheduling restriction on the downlink transmission of the second cell, where the first preset condition is: the SCS of the first cell is different from the SCS of the second cell, and the terminal is capable of simultaneously transmitting at least one of data, SSBs and RSs of different parameter sets.

In some embodiments, in a case that a frequency band accessed by the terminal is FR1, and a second preset condition is satisfied, the second cell satisfies at least one of the following: the restriction interval has a scheduling restriction on an uplink transmission of the second cell, and the restriction interval has a scheduling restriction on a downlink transmission of the second cell, where the second preset condition is: the SCS of the first cell is different from the SCS of the second cell, the terminal is incapable of simultaneously transmitting at least one of data, SSBs and RSs of different parameter sets, and the RS of the first cell is an uplink RS or a downlink RS.

In some embodiments, in a case that a frequency band accessed by the terminal is FR2, the second cell includes at least one of an uplink scheduling restriction and a downlink scheduling restriction in the restriction interval.

In some embodiments, in a case that a frequency band accessed by the terminal is FR2, a scheduling restriction on the second cell in the restriction interval is determined based on at least one of the following:

a quasi co-location reference signal QCL RS of the RS of the first cell is different from at least one of an uplink QCL RS and a downlink QCL RS of the second cell;

the RS of the first cell is an SSB; and a resource set where the RS of the first cell is located is configured with a repetition.

In some embodiments, in a case that a frequency band accessed by the terminal is FR2, the second cell being free from the scheduling restriction is determined based on at least one of the following:

a QCL RS of the RS of the first cell is the same as at least one of an uplink QCL RS and a downlink QCL RS of the second cell;

the RS of the first cell is any one of a CSI-RS, a TRS, and an SRS; and a resource set where the RS of the first cell is located has no repetitions.

In some embodiments, the rate matching includes: in a case that a target time domain resource of the second cell is within the restriction interval, a target frequency domain resource is unavailable for a target transmission, where the target transmission is at least one of an uplink transmission of the second cell and a downlink transmission of the second cell, and the target frequency domain resource is a frequency domain resource containing a transmission resource of the RS of the first cell.

In some embodiments, the RS of the first cell is an SSB of the first cell, and the target transmission is a transmission of a physical downlink shared channel PDSCH of the second cell.

In some embodiments, the rate matching is performed on the second cell in a case that at least one of an uplink transmission and a downlink transmission of the second cell is free from a scheduling restriction or at least one of the uplink transmission and the downlink transmission of the second cell is allowed within the restriction interval.

In some embodiments, in a case that the SCS of the first cell is different from the SCS of the second cell or a parameter set of the first cell is different from a parameter set of the second cell, a time domain resource and a frequency domain resource of one of the first cell and the second cell are calculated through conversion based on the SCS or parameter sets by taking the other cell as a reference, so as to perform rate matching on at least one of an uplink transmission and a downlink transmission of the second cell.

In this embodiment of this application, the RS measurement apparatus 400 receives RS measurement indication information sent by a network-side device, and performs layer 1 beam measurement for an RS of a first cell based on the RS measurement indication information. In addition, when performing the layer 1 beam measurement for the RS of the first cell, the RS measurement apparatus performs scheduling restriction and/or rate matching on a second cell, to coordinate interference between the cells. Therefore, a capacity of a communications system can be increased, which facilitates mobility management of the communications system and improves users' experience.

The RS measurement apparatus in this embodiment of this application may be an apparatus, or may be a component, an integrated circuit, or a chip in a terminal. The apparatus may be a mobile terminal, or a non-mobile terminal. For example, the mobile device may include but is not limited to the types of the terminal 11 listed above, and the non-mobile terminal may be a server, a Network Attached Storage (NAS), a Personal Computer (PC), a Television (TV), an automated teller machine, or a self-service machine. This is not specifically limited in the embodiments of this application.

The RS measurement apparatus in this embodiment of this application may be an apparatus with an operating system. The operating system may be an Android operating system, may be an iOS operating system, or may be another possible operating system, which is not specifically limited in the embodiments of this application.

The RS measurement apparatus provided in this embodiment of this application can implement the processes in the embodiment of the RS measurement method shown in FIG. 2, with the same technical effects achieved. To avoid repetition, details are not described herein again.

Referring to FIG. 5 which is a structural diagram of an RS measurement apparatus according to an embodiment of this application, the RS measurement apparatus may be applied to a network-side device. In some embodiments, the RS measurement apparatus further includes a processor. As shown in FIG. 5, the RS measurement apparatus 500 includes:

a sending module 501, configured to send RS measurement indication information to a terminal, where the RS measurement indication information is used to indicate that the terminal performs layer 1 beam measurement for an RS of a first cell and performs scheduling restriction and/or rate matching on a second cell.

In some embodiments, the first cell and the second cell include at least one of the following:

the first cell is a serving cell of the terminal, and the second cell is a neighboring cell;

the first cell is a neighboring cell, and the second cell is a serving cell of the terminal;

the first cell is a neighboring cell, and the second cell is a neighboring cell the same as the first cell; and the first cell is a neighboring cell, and the second cell is a neighboring cell different from the first cell.

In some embodiments, the RS includes at least one of the following:

a synchronization signal and PBCH block SSB, a channel state information reference signal CSI-RS, a sounding reference signal SRS, and a tracking reference signal TRS.

In some embodiments, the CSI-RS is a CSI-RS used for mobility measurement, and the SRS is an SRS used for positioning.

In some embodiments, the layer 1 beam measurement includes at least one of the following:

layer 1 reference signal received power RSRP measurement;

layer 1 signal-to-noise and interference ratio SINR measurement;

layer 1 reference signal received quality RSRQ measurement;

beam failure measurement for beam failure recovery; and candidate beam measurement for beam failure recovery.

In some embodiments, the scheduling restriction on the second cell includes downlink scheduling restriction and uplink scheduling restriction.

In some embodiments, a restriction interval of the scheduling restriction includes:

a first interval, where the first interval is determined based on a symbol where the RS of the first cell is located.

In some embodiments, the restriction interval further includes at least one of a second interval, a third interval and a fourth interval, where the second interval is determined based on the symbol where the RS of the first cell is located and K symbols before the symbol, where K is a positive integer;

the third interval is determined based on the symbol where the RS of the first cell is located and L symbols behind the symbol, where L is a positive integer; and the fourth interval is determined based on the symbol where the RS of the first cell is located, the K symbols before the symbol, and the L symbols behind the symbol.

In some embodiments, in a case that the first cell and the second cell have different subcarrier spacing SCS, the restriction interval satisfies at least one of the following:

the restriction interval is calculated based on a symbol of the first cell;

the restriction interval is calculated based on a symbol of the second cell; and the first interval is calculated based on the symbol of the first cell, and at least one of the second interval, the third interval, and the fourth interval is calculated based on the symbol of the second cell.

In some embodiments, at least one of a value of K and a value of L is determined based on a difference between timing of the first cell and timing of the second cell.

In some embodiments, in a case that the timing of the second cell is earlier than the timing of the first cell, the restriction interval is at least one of the first interval and the second interval; or in a case that the timing of the second cell is later than the timing of the first cell, the restriction interval is at least one of the first interval and the third interval.

In some embodiments, in a case that any preset condition is unsatisfied, the restriction interval is at least one of the first interval, the second interval, the third interval, and the fourth interval, where the preset condition includes at least one of the following:

timing of the first cell reported by the terminal has been received;

timing of the second cell reported by the terminal has been received;

a difference between the timing of the first cell and the timing of the second cell that is reported by the terminal has been received;

a timing requirement for the first cell reported by the terminal has been received;

a timing requirement for the second cell reported by the terminal has been received;

a requirement for the difference between the timing of the first cell and the timing of the second cell that is reported by the terminal has been received;

the timing of the first cell has been indicated;

the timing of the second cell has been indicated;

the difference between the timing of the first cell and the timing of the second cell has been indicated;

the timing requirement for the first cell has been indicated;

the timing requirement for the second cell has been indicated; and the requirement for the difference between the timing of the first cell and the timing of the second cell has been indicated.

In some embodiments, in a case that a frequency band accessed by the terminal is FR1, and the SCS of the first cell is the same as the SCS of the second cell, if the RS of the first cell is a downlink RS, the scheduling restriction on the second cell satisfies at least one of the following: the restriction interval has a scheduling restriction on an uplink transmission of the second cell, and the restriction interval has no scheduling restrictions on a downlink transmission of the second cell; or if the RS of the first cell is an uplink RS, the scheduling restriction on the second cell satisfies at least one of the following: the restriction interval has no scheduling restrictions on the uplink transmission of the second cell, and the restriction interval has a scheduling restriction on the downlink transmission of the second cell.

In some embodiments, in a case that a frequency band accessed by the terminal is FR1, and a first preset condition is satisfied, if the RS of the first cell is a downlink RS, the scheduling restriction on the second cell satisfies at least one of the following: the restriction interval has a scheduling restriction on an uplink transmission of the second cell, and the restriction interval has no scheduling restrictions on a downlink transmission of the second cell; or if the RS of the first cell is an uplink RS, the scheduling restriction on the second cell satisfies at least one of the following: the restriction interval has no scheduling restrictions on the uplink transmission of the second cell, and the restriction interval has a scheduling restriction on the downlink transmission of the second cell, where the first preset condition is: the SCS of the first cell is different from the SCS of the second cell, and the terminal is capable of simultaneously transmitting at least one of data, SSBs and RSs of different parameter sets.

In some embodiments, in a case that a frequency band accessed by the terminal is FR1, and a second preset condition is satisfied, the second cell satisfies at least one of the following: the restriction interval has a scheduling restriction on an uplink transmission of the second cell, and the restriction interval has a scheduling restriction on a downlink transmission of the second cell, where the second preset condition is: the SCS of the first cell is different from the SCS of the second cell, the terminal is incapable of simultaneously transmitting at least one of data, SSBs and RSs of different parameter sets, and the RS of the first cell is an uplink RS or a downlink RS.

In some embodiments, in a case that a frequency band accessed by the terminal is FR2, the second cell includes at least one of an uplink scheduling restriction and a downlink scheduling restriction in the restriction interval.

In some embodiments, in a case that a frequency band accessed by the terminal is FR2, a scheduling restriction on the second cell in the restriction interval is determined based on at least one of the following:

a quasi co-location reference signal QCL RS of the RS of the first cell is different from at least one of an uplink QCL RS and a downlink QCL RS of the second cell;

the RS of the first cell is an SSB; and a resource set where the RS of the first cell is located is configured with a repetition.

In some embodiments, in a case that a frequency band accessed by the terminal is FR2, the second cell being free from the scheduling restriction is determined based on at least one of the following:

a QCL RS of the RS of the first cell is the same as at least one of an uplink QCL RS and a downlink QCL RS of the second cell;

the RS of the first cell is any one of a CSI-RS, a TRS, and an SRS; and a resource set where the RS of the first cell is located has no repetitions.

In some embodiments, the rate matching includes: in a case that a target time domain resource of the second cell is within the restriction interval, a target frequency domain resource is unavailable for a target transmission, where the target transmission is at least one of an uplink transmission of the second cell and a downlink transmission of the second cell, and the target frequency domain resource is a frequency domain resource containing a transmission resource of the RS of the first cell.

In some embodiments, the RS of the first cell is an SSB of the first cell, and the target transmission is a transmission of a physical downlink shared channel PDSCH of the second cell.

In some embodiments, the RS measurement indication information is used to indicate that the terminal performs the rate matching on the second cell in a case that at least one of an uplink transmission and a downlink transmission of the second cell is free from a scheduling restriction or at least one of the uplink transmission and the downlink transmission of the second cell is allowed within the restriction interval.

In some embodiments, in a case that the SCS of the first cell is different from the SCS of the second cell or a parameter set of the first cell is different from a parameter set of the second cell, a time domain resource and a frequency domain resource of one of the first cell and the second cell are calculated through conversion based on the SCS or parameter sets by taking the other cell as a reference, so as to perform rate matching on at least one of an uplink transmission and a downlink transmission of the second cell.

In this embodiment of this application, the RS measurement apparatus 500 sends RS measurement indication information to a terminal, so that the terminal is enabled to perform layer 1 beam measurement for an RS of a first cell and perform scheduling restriction and/or rate matching on a second cell based on the RS measurement indication information, thereby coordinating interference between the cells and increasing a capacity of a communications system. This better facilitates mobility management of the communications system and improves users' experience.

The RS measurement apparatus 500 in this embodiment of this application may be an apparatus, or may be a component, an integrated circuit, or a chip in a network-side device. The RS measurement apparatus 500 provided in this embodiment of this application can implement the processes in the embodiment of the RS measurement method shown in FIG. 3, with the same technical effects achieved. To avoid repetition, details are not described herein again.

In some embodiments, as shown in FIG. 6, an embodiment of this application further provides a communications device 600, including a processor 601, a memory 602, and a program or instructions stored in the memory 602 and executable by the processor 601. For example, in a case that the communications device 600 is a terminal, when the program or instructions are executed by the processor 601, the processes of the embodiment of the RS measurement method are implemented, with the same technical effects achieved; or in a case that the communications device 600 is a network-side device, when the program or instructions are executed by the processor 601, the processes of the foregoing embodiment of the RS measurement method shown in FIG. 3 are implemented, with the same technical effects achieved. To avoid repetition, details are not described herein again.

Figure 7:
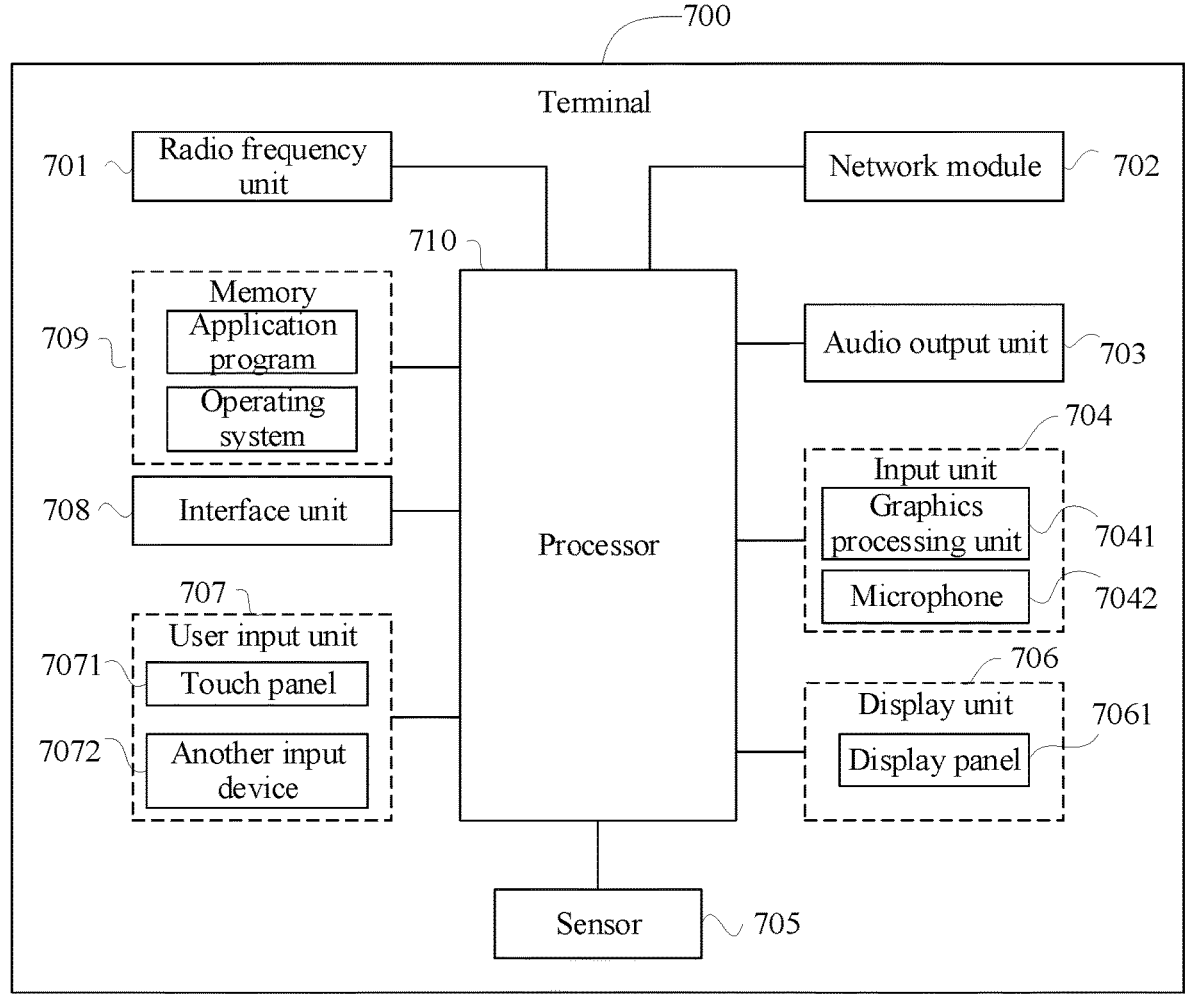
FIG. 7 is a structural diagram of a terminal according to an embodiment of this application.

FIG. 7 is a schematic diagram of a hardware structure of a terminal according to an embodiment of this application.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

It may be understood by a person skilled in the art that the terminal 700 may further include a power supply (such as a battery) that supplies power to each component. The power supply may be logically connected to the processor 710 by using a power management system, to implement functions such as charging, discharging, and power consumption management by using the power management system. The terminal structure shown in FIG. 7 constitutes no limitation on the terminal, and the terminal may include more or fewer components than those shown in the figure, or combine some components, or have different component arrangements. Details are not described herein.

It should be understood that, in the embodiments of this application, the input unit 704 may include a Graphics Processing Unit (GPU) 7041 and a microphone 7042, and the GPU 7041 processes image data of a still picture or video obtained by an image capture apparatus (such as a camera) in a video capture mode or an image capture mode. The display unit 706 may include a display panel 7061, and the display panel 7061 may be configured in a form of a liquid crystal display, an organic light-emitting diode, or the like. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein.

In this embodiment of this application, the radio frequency unit 701 receives downlink data from a network-side device and sends the downlink data to the processor 710 for processing; and in addition, sends uplink data to the network-side device. Usually, the radio frequency unit 701 includes but is not limited to an antenna, at least one amplifier, a transceiver, a coupler, a low noise amplifier, a duplexer, and the like.

The memory 709 may be configured to store a software program or an instruction and various data. The memory 709 may mainly include a program or instruction storage area and a data storage area. The program or instruction storage area may store an operating system, and an application or an instruction required by at least one function (for example, a sound playing function or an image playing function). In addition, the memory 709 may include a high-speed random access memory, and may further include a non-volatile memory. The non-volatile memory may be a Read-Only Memory (ROM), a Programmable ROM (PROM), an Erasable PROM (EPROM), an Electrically EPROM (EE- PROM), or a flash memory, for example, at least one disk storage component, a flash memory component, or another non-volatile solid-state storage component.

The processor 710 may include one or more processing units. In some embodiments, an application processor and a modem processor may be integrated into the processor 710. The application processor mainly processes an operating system, a user interface, an application, an instruction, or the like. The modem processor mainly processes wireless communications, for example, a baseband processor. It can be understood that, in some alternative embodiments, the modem processor may not be integrated into the processor 710.

The radio frequency unit 701 is configured to receive RS measurement indication information sent by a network-side device, where the RS measurement indication information is used to indicate that the terminal performs layer 1 beam measurement for an RS of a first cell.

The processor 710 is configured to perform the layer 1 beam measurement for the RS of the first cell based on the RS measurement indication information, where the terminal performs scheduling restriction and/or rate matching on a second cell when performing the layer 1 beam measurement for the RS of the first cell.

In some embodiments, the scheduling restriction and/or rate matching is determined based on any one of the following:

configuration information sent by the network-side device; and a protocol stipulation.

In some embodiments, the first cell and the second cell include at least one of the following:

the first cell is a serving cell of the terminal, and the second cell is a neighboring cell;

the first cell is a neighboring cell, and the second cell is a serving cell of the terminal;

the first cell is a neighboring cell, and the second cell is a neighboring cell the same as the first cell; and the first cell is a neighboring cell, and the second cell is a neighboring cell different from the first cell.

In some embodiments, the RS includes at least one of the following:

a synchronization signal and PBCH block SSB, a channel state information reference signal CSI-RS, a sounding reference signal SRS, and a tracking reference signal TRS.

In some embodiments, the CSI-RS is a CSI-RS used for mobility measurement, and the SRS is an SRS used for positioning.

In some embodiments, the layer 1 beam measurement includes at least one of the following:

layer 1 reference signal received power RSRP measurement;

layer 1 signal-to-noise and interference ratio SINR measurement;

layer 1 reference signal received quality RSRQ measurement;

beam failure measurement for beam failure recovery; and candidate beam measurement for beam failure recovery.

In some embodiments, the scheduling restriction on the second cell includes downlink scheduling restriction and uplink scheduling restriction.

In some embodiments, a restriction interval of the scheduling restriction includes:

a first interval, where the first interval is determined based on a symbol where the RS of the first cell is located.

In some embodiments, the restriction interval further includes at least one of a second interval, a third interval and a fourth interval, where the second interval is determined based on the symbol where the RS of the first cell is located and K symbols before the symbol, where K is a positive integer;

the third interval is determined based on the symbol where the RS of the first cell is located and L symbols behind the symbol, where L is a positive integer; and the fourth interval is determined based on the symbol where the RS of the first cell is located, the K symbols before the symbol, and the L symbols behind the symbol.

In some embodiments, in a case that the first cell and the second cell have different subcarrier spacing SCS, the restriction interval satisfies any of the following:

the restriction interval is calculated based on a symbol of the first cell;

the restriction interval is calculated based on a symbol of the second cell; and the first interval is calculated based on the symbol of the first cell, and at least one of the second interval, the third interval, and the fourth interval is calculated based on the symbol of the second cell.

In some embodiments, at least one of a value of K and a value of L is determined based on a difference between timing of the first cell and timing of the second cell.

In some embodiments, in a case that the timing of the second cell is earlier than the timing of the first cell, the restriction interval is at least one of the first interval and the second interval; or in a case that the timing of the second cell is later than the timing of the first cell, the restriction interval is at least one of the first interval and the third interval.

In some embodiments, in a case that any preset condition is unsatisfied, the restriction interval is at least one of the first interval, the second interval, the third interval, and the fourth interval, where the preset condition includes at least one of the following:

the terminal has measured timing of the first cell;

the terminal has measured timing of the second cell;

the terminal has measured a difference between the timing of the first cell and the timing of the second cell;

the terminal has reported the timing of the first cell;

the terminal has reported the timing of the second cell;

the terminal has reported the difference between the timing of the first cell and the timing of the second cell;

the terminal has reported a timing requirement for the first cell;

the terminal has reported a timing requirement for the second cell;

the terminal has reported a requirement for the difference between the timing of the first cell and the timing of the second cell;

configuration information received by the terminal indicates the timing of the first cell;

the configuration information received by the terminal indicates the timing of the second cell;

the configuration information received by the terminal indicates the difference between the timing of the first cell and the timing of the second cell;

the configuration information received by the terminal indicates the timing requirement for the first cell;

the configuration information received by the terminal indicates the timing requirement for the second cell; and the configuration information received by the terminal indicates the requirement for the difference between the timing of the first cell and the timing of the second cell.

In some embodiments, in a case that a frequency band accessed by the terminal is FR1, and the SCS of the first cell is the same as the SCS of the second cell, if the RS of the first cell is a downlink RS, the scheduling restriction on the second cell satisfies at least one of the following: the restriction interval has a scheduling restriction on an uplink transmission of the second cell, and the restriction interval has no scheduling restrictions on a downlink transmission of the second cell; or if the RS of the first cell is an uplink RS, the scheduling restriction on the second cell satisfies at least one of the following: the restriction interval has no scheduling restrictions on the uplink transmission of the second cell, and the restriction interval has a scheduling restriction on the downlink transmission of the second cell.

In some embodiments, in a case that a frequency band accessed by the terminal is FR1, and a first preset condition is satisfied, if the RS of the first cell is a downlink RS, the second cell satisfies at least one of the following: the restriction interval has a scheduling restriction on an uplink transmission of the second cell, and the restriction interval has no scheduling restrictions on a downlink transmission of the second cell; or if the RS of the first cell is an uplink RS, the second cell satisfies at least one of the following: the restriction interval has no scheduling restrictions on the uplink transmission of the second cell, and the restriction interval has a scheduling restriction on the downlink transmission of the second cell, where the first preset condition is: the SCS of the first cell is different from the SCS of the second cell, and the terminal is capable of simultaneously transmitting at least one of data, SSBs and RSs of different parameter sets.

In some embodiments, in a case that a frequency band accessed by the terminal is FR1, and a second preset condition is satisfied, the second cell satisfies at least one of the following: the restriction interval has a scheduling restriction on an uplink transmission of the second cell, and the restriction interval has a scheduling restriction on a downlink transmission of the second cell, where the second preset condition is: the SCS of the first cell is different from the SCS of the second cell, the terminal is incapable of simultaneously transmitting at least one of data, SSBs and RSs of different parameter sets, and the RS of the first cell is an uplink RS or a downlink RS.

In some embodiments, in a case that a frequency band accessed by the terminal is FR2, the second cell includes at least one of an uplink scheduling restriction and a downlink scheduling restriction in the restriction interval.

In some embodiments, in a case that a frequency band accessed by the terminal is FR2, a scheduling restriction on the second cell in the restriction interval is determined based on at least one of the following:

a quasi co-location reference signal QCL RS of the RS of the first cell is different from at least one of an uplink QCL RS and a downlink QCL RS of the second cell;

the RS of the first cell is an SSB; and a resource set where the RS of the first cell is located is configured with a repetition.

In some embodiments, in a case that a frequency band accessed by the terminal is FR2, the second cell being free from the scheduling restriction is determined based on at least one of the following:

a QCL RS of the RS of the first cell is the same as at least one of an uplink QCL RS and a downlink QCL RS of the second cell;

the RS of the first cell is any one of a CSI-RS, a TRS, and an SRS; and a resource set where the RS of the first cell is located has no repetitions.

In some embodiments, the rate matching includes: in a case that a target time domain resource of the second cell is within the restriction interval, a target frequency domain resource is unavailable for a target transmission, where the target transmission is at least one of an uplink transmission of the second cell and a downlink transmission of the second cell, and the target frequency domain resource is a frequency domain resource containing a transmission resource of the RS of the first cell.

In some embodiments, the RS of the first cell is an SSB of the first cell, and the target transmission is a transmission of a physical downlink shared channel PDSCH of the second cell.

In some embodiments, the rate matching is performed on the second cell in a case that at least one of an uplink transmission and a downlink transmission of the second cell is free from a scheduling restriction or at least one of the uplink transmission and the downlink transmission of the second cell is allowed within the restriction interval.

In some embodiments, in a case that the SCS of the first cell is different from the SCS of the second cell or a parameter set of the first cell is different from a parameter set of the second cell, a time domain resource and a frequency domain resource of one of the first cell and the second cell are calculated through conversion based on the SCS or parameter sets by taking the other cell as a reference, so as to perform rate matching on at least one of an uplink transmission and a downlink transmission of the second cell.

In this embodiment of this application, the terminal 700 receives RS measurement indication information sent by a network-side device, and performs layer 1 beam measurement for an RS of a first cell based on the RS measurement indication information. In addition, when performing the layer 1 beam measurement for the RS of the first cell, the terminal 700 performs scheduling restriction and/or rate matching on a second cell, to coordinate interference between the cells. Therefore, a capacity of a communications system can be increased, which facilitates mobility management of the communications system and improves users' experience.

Figure 8:
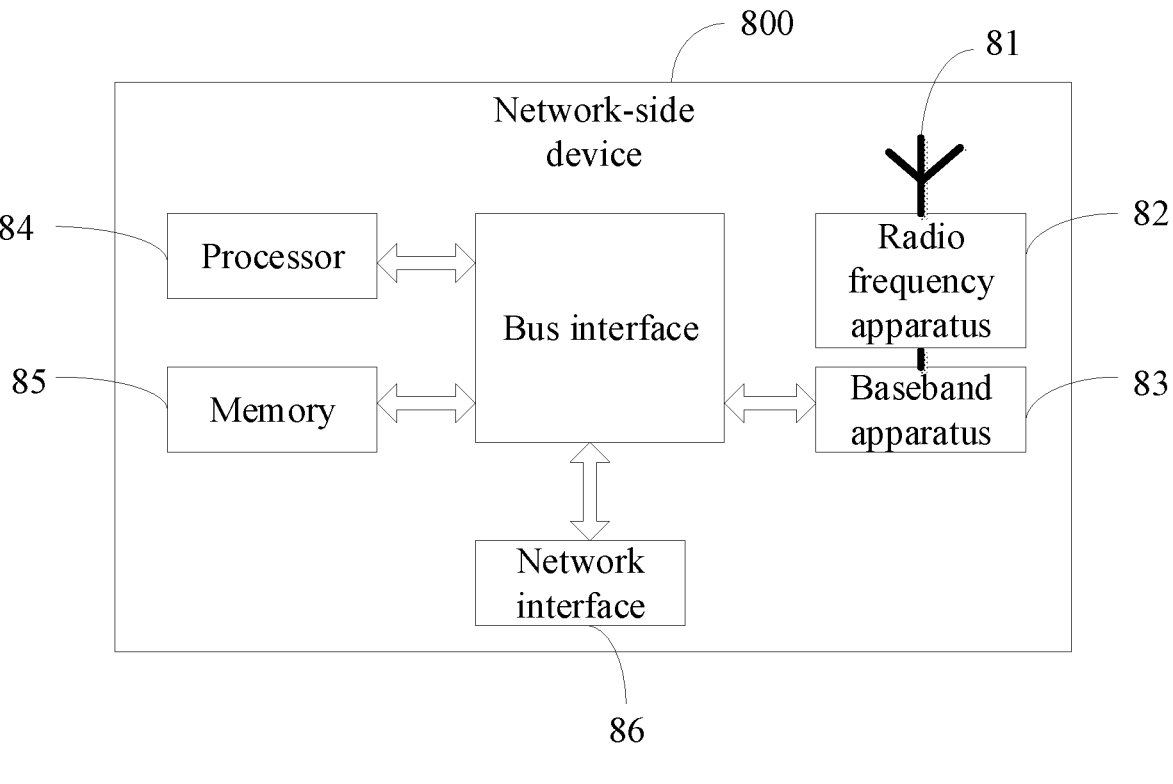
FIG. 8 is a structural diagram of a network-side device according to an embodiment of this application.

For example, an embodiment of this application further provides a network-side device. As shown in FIG. 8, a network-side device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and transmits the received information to the baseband apparatus 83 for processing. In a downlink direction, the baseband apparatus 83 processes information that needs to be sent, and sends processed information to the radio frequency apparatus 82. The radio frequency apparatus 82 processes the received information, and sends processed information by using the antenna 81.

The frequency band processing apparatus may be located in the baseband apparatus 83. The method performed by the network-side device in the above embodiment may be implemented in the baseband apparatus 83. The baseband apparatus 83 includes a processor 84 and a memory 85.

The baseband apparatus 83 may include, for example, at least one baseband board, where a plurality of chips are disposed on the baseband board. As shown in FIG. 8, one chip is, for example, the processor 84, which is connected to the memory 85, so as to invoke a program in the memory 85 to perform operations of the network device shown in the foregoing method embodiment.

The baseband apparatus 83 may further include a network interface 86, configured to exchange information with the radio frequency apparatus 82. For example, the interface is a Common Public Radio Interface (CPRI).

For example, the network-side device in this embodiment of this application further includes an instruction or a program that is stored in the memory 85 and that can run on the processor 84. The processor 84 invokes the instruction or the program in the memory 85 to perform the method performed by the modules shown in FIG. 5, and a same technical effect is achieved. To avoid repetition, details are not described herein.

An embodiment of this application further provides a readable storage medium. The readable storage medium stores a program or instructions. When the program or instructions are executed by a processor, the processes in the foregoing embodiment of the RS measurement method shown in FIG. 2 or the processes in the foregoing embodiment of the RS measurement method shown in FIG. 3 are implemented, with the same technical effects achieved. To avoid repetition, details are not described herein again.

The processor is a processor in the terminal in the above embodiment. The readable storage medium includes a computer-readable storage medium such as an ROM, a Random Access Memory (RAM), a magnetic disk, an optical disc, or the like.

An embodiment of this application further provides a chip. The chip includes a processor and a communications interface. The communications interface is coupled to the processor. The processor is configured to run a program or instructions of a network-side device to implement the processes in the foregoing embodiment of the RS measurement method shown in FIG. 2 or the processes in the foregoing embodiment of the RS measurement method shown in FIG. 3, with the same technical effects achieved. To avoid repetition, details are not described herein again.

It should be understood that the chip mentioned in the embodiment of this application may also be referred to as a system-level chip, a system chip, a chip system, or a system on chip.

It should be noted that, in this specification, the terms "include", "include", or their any other variant is intended to cover a non-exclusive inclusion, so that a process, a method, an article, or an apparatus that includes a list of elements not only includes those elements, but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. In some embodiments, the technical solutions of this application, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

What is claimed is:

1. A Reference Signal (RS) measurement method, performed by a terminal, comprising:
   receiving RS measurement indication information sent by a network-side device, wherein the RS measurement indication information is used to indicate that the terminal performs layer 1 beam measurement for an RS of a first cell; and
   performing the layer 1 beam measurement for the RS of the first cell based on the RS measurement indication information, wherein
   the terminal performs scheduling restriction or rate matching on a second cell concurrently with performing the layer 1 beam measurement for the RS of the first cell, wherein:
   the scheduling restriction comprises restricting an uplink transmission or a downlink transmission of the second cell in at least one restriction interval, wherein the at least one restriction interval is determined based on a symbol where the RS of the first cell is located, and
   the rate matching comprises: when a target time domain resource of the second cell is within the at least one restriction interval, a target frequency domain resource is unavailable for a target transmission, wherein the target transmission is at least one of the uplink transmission of the second cell or the downlink transmission of the second cell, and the target frequency domain resource is a frequency domain resource containing a transmission resource of the RS of the first cell.

2. The RS measurement method according to claim 1, wherein the scheduling restriction or the rate matching is determined based on any one of the following:
   configuration information sent by the network-side device; or
   a protocol stipulation.

3. The RS measurement method according to claim 1, wherein the first cell and the second cell comprise at least one of the following:

the first cell is a serving cell of the terminal, and the second cell is a neighboring cell;

the first cell is a neighboring cell, and the second cell is a serving cell of the terminal;

the first cell is a neighboring cell, and the second cell is another neighboring cell the same as the first cell; or the first cell is a neighboring cell, and the second cell is another neighboring cell different from the first cell.

4. The RS measurement method according to claim 1, wherein the RS comprises at least one of the following:

a Synchronization Signal and PBCH Block (SSB), a Channel State Information Reference Signal (CSI-RS), a Sounding Reference Signal (SRS), and a Tracking Reference Signal (TRS).

5. The RS measurement method according to claim 4, wherein the CSI-RS is a CSI-RS used for mobility measurement, and the SRS is an SRS used for positioning.

6. The RS measurement method according to claim 1, wherein the layer 1 beam measurement comprises at least one of the following:

layer 1 Reference Signal Received Power (RSRP) measurement;

layer 1 Signal-to-noise and Interference Ratio (SINR) measurement;

layer 1 Reference Signal Received Quality (RSRQ) measurement;

beam failure measurement for beam failure recovery; or candidate beam measurement for beam failure recovery.

7. The RS measurement method according to claim 1, wherein the scheduling restriction on the second cell comprises downlink scheduling restriction and uplink scheduling restriction.

8. The RS measurement method according to claim 1, wherein the at least one restriction interval of the scheduling restriction comprises:

a first interval, wherein the first interval is determined based on a symbol where the RS of the first cell is located.

9. The RS measurement method according to claim 8, wherein the at least one restriction interval further comprises at least one of a second interval, a third interval or a fourth interval, wherein the second interval is determined based on the symbol where the RS of the first cell is located and K symbols before the symbol, wherein K is a positive integer;

the third interval is determined based on the symbol where the RS of the first cell is located and L symbols behind the symbol, wherein L is a positive integer; and the fourth interval is determined based on the symbol where the RS of the first cell is located, the K symbols before the symbol, and the L symbols behind the symbol.

10. The RS measurement method according to claim 9, wherein when the first cell and the second cell have different Subcarrier Spacing (SCS), the at least one restriction interval satisfies any of the following:

the at least one restriction interval is calculated based on a symbol of the first cell;

the at least one restriction interval is calculated based on a symbol of the second cell; or the first interval is calculated based on the symbol of the first cell, and at least one of the second interval, the third interval, or the fourth interval is calculated based on the symbol of the second cell.

11. The RS measurement method according to claim 9, wherein at least one of a value of K and a value of L is determined based on a difference between timing of the first cell and timing of the second cell.

12. The RS measurement method according to claim 9, wherein when the timing of the second cell is earlier than the timing of the first cell, the at least one restriction interval is at least one of the first interval and the second interval; or when the timing of the second cell is later than the timing of the first cell, the at least one restriction interval is at least one of the first interval or the third interval.

13. The RS measurement method according to claim 9, wherein when any preset condition is unsatisfied, the at least one restriction interval is at least one of the first interval, the second interval, the third interval, or the fourth interval, wherein the preset condition comprises at least one of the following:

the terminal has measured timing of the first cell;

the terminal has measured timing of the second cell;

the terminal has measured a difference between the timing of the first cell and the timing of the second cell;

the terminal has reported the timing of the first cell;

the terminal has reported the timing of the second cell;

the terminal has reported the difference between the timing of the first cell and the timing of the second cell;

the terminal has reported a timing requirement for the first cell;

the terminal has reported a timing requirement for the second cell;

the terminal has reported a requirement for the difference between the timing of the first cell and the timing of the second cell;

configuration information received by the terminal indicates the timing of the first cell;

the configuration information received by the terminal indicates the timing of the second cell;

the configuration information received by the terminal indicates the difference between the timing of the first cell and the timing of the second cell;

the configuration information received by the terminal indicates the timing requirement for the first cell;

the configuration information received by the terminal indicates the timing requirement for the second cell; and the configuration information received by the terminal indicates the requirement for the difference between the timing of the first cell and the timing of the second cell.

14. The RS measurement method according to claim 8, wherein when a frequency band accessed by the terminal is FR1, and the SCS of the first cell is the same as the SCS of the second cell, when the RS of the first cell is a downlink RS, the scheduling restriction on the second cell satisfies at least one of the following: the at least one restriction interval has a scheduling restriction on an uplink transmission of the second cell, or the at least one restriction interval has no scheduling restrictions on a downlink transmission of the second cell; or when the RS of the first cell is an uplink RS, the scheduling restriction on the second cell satisfies at least one of the following: the at least one restriction interval has no scheduling restrictions on the uplink transmission of the second cell, or the at least one restriction interval has a scheduling restriction on the downlink transmission of the second cell.

15. The RS measurement method according to claim 8, wherein when a frequency band accessed by the terminal is FR1, and a first preset condition is satisfied, when the RS of the first cell is a downlink RS, the scheduling restriction on the second cell satisfies at least one of the following: the at least one restriction interval has a scheduling restriction on an uplink transmission of the second cell, or the at least one restriction interval has no scheduling restrictions on a downlink transmission of the second cell; or when the RS of the first cell is an uplink RS, the scheduling restriction on the second cell satisfies at least one of the following: the at least one restriction interval has no scheduling restrictions on the uplink transmission of the second cell, or the at least one restriction interval has a scheduling restriction on the downlink transmission of the second cell, wherein the first preset condition is: the SCS of the first cell is different from the SCS of the second cell, and the terminal is capable of simultaneously transmitting at least one of data, SSBs or RSs of different parameter sets.

16. The RS measurement method according to claim 8, wherein when a frequency band accessed by the terminal is FR1, and a second preset condition is satisfied, the second cell satisfies at least one of the following: the at least one restriction interval has a scheduling restriction on an uplink transmission of the second cell, or the at least one restriction interval has a scheduling restriction on a downlink transmission of the second cell, wherein the second preset condition is: the SCS of the first cell is different from the SCS of the second cell, the terminal is incapable of simultaneously transmitting at least one of data, SSBs or RSs of different parameter sets, and the RS of the first cell is an uplink RS or a downlink RS.

17. The RS measurement method according to claim 8, wherein when a frequency band accessed by the terminal is FR2, the second cell comprises at least one of an uplink scheduling restriction or a downlink scheduling restriction in the restriction interval.

18. The RS measurement method according to claim 8, wherein when a frequency band accessed by the terminal is FR2, the scheduling restriction on the second cell in the at least one restriction interval is determined based on at least one of the following:

a Quasi Co-Location Reference Signal (QCL RS) of the RS of the first cell is different from at least one of an uplink QCL RS and a downlink QCL RS of the second cell;

the RS of the first cell is a Synchronization Signal and PBCH Block (SSB); and a resource set where the RS of the first cell is located is configured with a repetition.

19. A Reference Signal (RS) measurement method, performed by a network-side device, comprising:

sending RS measurement indication information to a terminal, wherein

34 the RS measurement indication information is used to indicate that the terminal concurrently performs:

layer 1 beam measurement for an RS of a first cell, and scheduling restriction or rate matching on a second cell, wherein:

the scheduling restriction comprises restricting an uplink transmission or a downlink transmission of the second cell in at least one restriction interval, wherein the at least one restriction interval is determined based on a symbol where the RS of the first cell is located, and the rate matching comprises: when a target time domain resource of the second cell is within the at least one restriction interval, a target frequency domain resource is unavailable for a target transmission, wherein the target transmission is at least one of an uplink transmission of the second cell or a downlink transmission of the second cell, and the target frequency domain resource is a frequency domain resource containing a transmission resource of the RS of the first cell.

20. A communications device, comprising a processor; and a memory having a computer program or instructions stored thereon, wherein the computer program or instructions, when executed by the processor, cause the processor to perform operations comprising:

receiving Reference Signal (RS) measurement indication information sent by a network-side device, wherein the RS measurement indication information indicates the communications device to perform layer 1 beam measurement for an RS of a first cell; and performing the layer 1 beam measurement for the RS of the first cell based on the RS measurement indication information, wherein the communications device performs scheduling restriction or rate matching on a second cell concurrently with performing the layer 1 beam measurement for the RS of the first cell, wherein:

the scheduling restriction comprises restricting an uplink transmission or a downlink transmission of the second cell in at least one restriction interval, wherein the at least one restriction interval is determined based on a symbol where the RS of the first cell is located, and the rate matching comprises: when a target time domain resource of the second cell is within the at least one restriction interval, a target frequency domain resource is unavailable for a target transmission, wherein the target transmission is at least one of an uplink transmission of the second cell or a downlink transmission of the second cell, and the target frequency domain resource is a frequency domain resource containing a transmission resource of the RS of the first cell.

* * * * *